US012689458B2

(12) United States Patent    (10) Patent No.:   US 12,689,458 B2

Che    (45) Date of Patent:    Jul. 21, 2026

(54) COMB-BASED WAVELENGTH DIVISION MULTIPLEXING

(71) Applicant: Nokia Solutions and Networks Oy, Espoo (FI)

(72) Inventor: Di Che, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 195 days.

(21) Appl. No.: 18/612,307

(22) Filed: Mar. 21, 2024

(65) Prior Publication Data

US 2025/0300754 A1    Sep. 25, 2025

(51) Int. Cl.
| | |
|---|---|
| *H04J 14/02* | (2006.01) |
| *G02B 6/02* | (2006.01) |
| *G02B 6/036* | (2006.01) |
| *H04B 10/2525* | (2013.01) |

(52) U.S. Cl.
CPC ...... *H04J 14/0202* (2013.01); *G02B 6/02242* (2013.01); *G02B 6/03611* (2013.01); *H04B 10/25253* (2013.01)

(58) Field of Classification Search
CPC .................................................... H04J 14/04
See application file for complete search history.

(56) References Cited

U.S. PATENT DOCUMENTS

| | | |
|---|---|---|
| 7,706,688 B2 | 4/2010 | Boudreault et al. |
| 2023/0387968 A1 | 11/2023 | Eshaghi et al. |

OTHER PUBLICATIONS

Ma et al., "High-speed secure key distribution based on chaos synchronization and optical frequency comb technology", Jan. 20, 2022, 13th International Photonics and OptoElectronics Meetings (POEM 2021), Proc. of SPIE vol. 12154, 1215406, pp. 1-4 (Year: 2022).*

Frequency Domain Interleaving for Dense WDM Passive Optical Network, by Coelho et al. , Jun. 2019Journal of Microwaves Optoelectronics and Electromagnetic Applications 18(2):196-207; DOI:10.1590/2179-10742019v18121643.

Zhou, Z., Nie, Ht. & Wang, Yj. Long reach DWDM-PON with 12.5 GHz channel spacing based on comb source seeding. Optoelectron. Lett. 12, 304-307 (2016). https://doi.org/10.1007/s11801-016-6092-4.

(Continued)

*Primary Examiner* — David W Lambert

(74) *Attorney, Agent, or Firm* — Carter, DeLuca & Farrell LLP

(57) ABSTRACT

An optical transmitter capable of colorless WDM includes a source of optical frequency comb (OFC) light having a plurality of separate optical frequency tones, and a plurality of optical modulators connected in parallel to modulate different parts of the OFC light with corresponding modulating signals, each of the parts including the plurality of separate optical frequency tones. An optical combiner combines the different parts of the OFC light to obtain an output optical signal of the optical transmitter. MIMO processing may be used to recover the modulating signals at an optical receiver using, or to configure the modulating signals at the transmitter so that each of the frequency tones is modulated with a corresponding target data signal.

20 Claims, 8 Drawing Sheets

(56)           References Cited

OTHER PUBLICATIONS

Cost effective OLT designed from optical frequency comb generator based EML for1.22_Tbps wavelength division multiplexed passive optical network, by Ullah et al., Optical Fiber Technology, vol. 43, Jul. 2018, pp. 49-56.

Marin-Palomo, P., Kemal, J., Karpov, M. et al. Microresonator-based solitons for massively parallel coherent optical communications. Nature 546, 274-279 (2017). https://doi.org/10.1038/nature22387.

Fülöp, Attila, et al. "High-order coherent communications using mode-locked dark-pulse Kerr combs from microresonators." Nature communications 9.1 (2018): 1598.

Lundberg, Lars, et al. "Phase-coherent lightwave communications with frequency combs." Nature communications 11.1 (2020): 201.

Corcoran, Bill, et al. "Optical data transmission at 44Tb/s and 10 bits/s/Hz over the C-band with standard fibre and a single micro-comb source." arXiv preprint arXiv:2003.11893 (2020).

Yamazaki, Hiroshi, et al. "Single-Carrier 2.5-Tbps Transmission Using CSRZ-OTDM with 8×4 Digital Calibrator." Journal of Lightwave Technology (2024).

* cited by examiner

Transmitter <u>300</u>

800

Optical signal
generated by
method 700

Using a multi-channel optical receiver to detect
modulation signal in each of the frequency tones
of received light — 810

Performing MIMO equalization processing on
the detected modulation signals to de-multiplex
the modulating signals of the Tx — 810

Recovered modulation
signals

900

Split OFC light to propagate in parallel along N paths — 910

Performing MIMO processing of N target nodulation signals to obtain N modulating signals — 920

Modulate the light in each of the paths with a corresponding one of the modulating signal — 930

Combine the modulated light with different delays — 940

Output optical signal

COMB-BASED WAVELENGTH DIVISION MULTIPLEXING

TECHNICAL FIELD

The present disclosure generally relates to optical communication systems with wavelength multiplexing and elements of such systems.

BACKGROUND

Modern broad-band optical communication systems typically use wavelength division multiplexing (WDM) at a transmitter site and optical coherent detection at a receiver site. Conventionally, different wavelength channels are multiplexed at an optical transmitter site using wavelength-selective optical elements, termed wavelength multiplexers (MUX), which are finely tuned to a specific set of wavelengths. Such a "colored" transmitter typically requires a precise wavelength control for the transmitter lasers, which increases both the laser cost and energy consumption for cooling and temperature-stabilization of all the wavelength-dependent components in the coherent system. The power consumption issue complicates the dense deployment of coherent optical systems in data centers.

SUMMARY

An aspect of the present disclosure provides an apparatus including an optical transmitter. The optical transmitter comprises an optical frequency comb (OFC) source to provide OFC light comprising a plurality of separate optical frequency tones, and an optical splitter to split the OFC light to propagate along at least three different paths. Each of the paths comprises an optical modulator to modulate received light with a respective modulating signal, wherein the received light of each of the optical modulators comprises the plurality of separate optical frequency tones. The optical transmitter further comprises an optical combiner for combining the different parts of the light to obtain an output optical signal of the optical transmitter. The at least three paths have different optical path lengths to impose different delays to light propagating along different ones of the paths.

A related aspect of the present disclosure provides a method for optically transmitting a plurality of data signals. The method comprises: splitting light comprising a comb of separate optical frequency tones to propagate along at least three optical paths; modulating parts of the light propagating along the at least three optical paths with respective modulating signals, each of the parts comprising the comb of separate optical frequency tones; and, combining the at least three different parts of the light to obtain an output optical signal such that different ones of the parts are combined in the output optical signal with different delays.

A related aspect of the present disclosure provides a system comprising an optical transmitter and an optical receiver. The optical transmitter comprises an OFC source to provide OFC light, the OFC light comprising a plurality of separate optical frequency tones. The optical transmitter further comprises a plurality of optical modulators connected to modulate different parts of the OFC light with respective modulating signals, each of the parts comprising the plurality of separate optical frequency tones. The optical transmitter further comprises an optical combiner to combine the different parts of the OFC light with different respective delays to obtain an output optical signal. The optical receiver comprises a plurality of optical-to-electrical (OE) converters to detect modulation of respective ones of the optical frequency tones in an optical signal received from the optical transmitter, and to output a plurality of detected modulation signals. The optical receiver further comprises a digital signal processor configured to perform multi-input multi-output (MIMO) processing on the plurality of detected modulation signals to separately estimate the modulating signals of the optical transmitter.

BRIEF DESCRIPTION OF THE DRAWINGS

Embodiments disclosed herein will be described in greater detail with reference to the accompanying drawings representing example embodiments thereof, in which like elements are indicated with like reference numerals, and wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits may be omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future.

Note that as used herein, the terms "first", "second" and so forth are not intended to imply sequential ordering, but rather are intended to distinguish one element from another, unless explicitly stated. Similarly, sequential ordering of method steps does not imply a requirement of sequential order of their execution, unless explicitly stated. The term "connected" may encompass direct connections or indirect connections through intermediate elements, unless explicitly stated otherwise.

The following abbreviations and acronyms may be used in the present document:

ADC analog to digital converter
DAC digital to analog converter
DEMUX: demultiplexer
MUX: multiplexer
DP: dual polarization
DSP: digital signal processor
EO: electro-optical
EOC: electrical to optical converter
OEC: optical to electrical converter
LO: local oscillator
MIMO: multi-input multi-output
Rx: receiver
Tx: transmitter
WDM: wavelength division multiplexing Various embodiments described below relate to an apparatus, and a corresponding method, for optical WDM communications with colorless wavelength channel combining.

Figure 1:
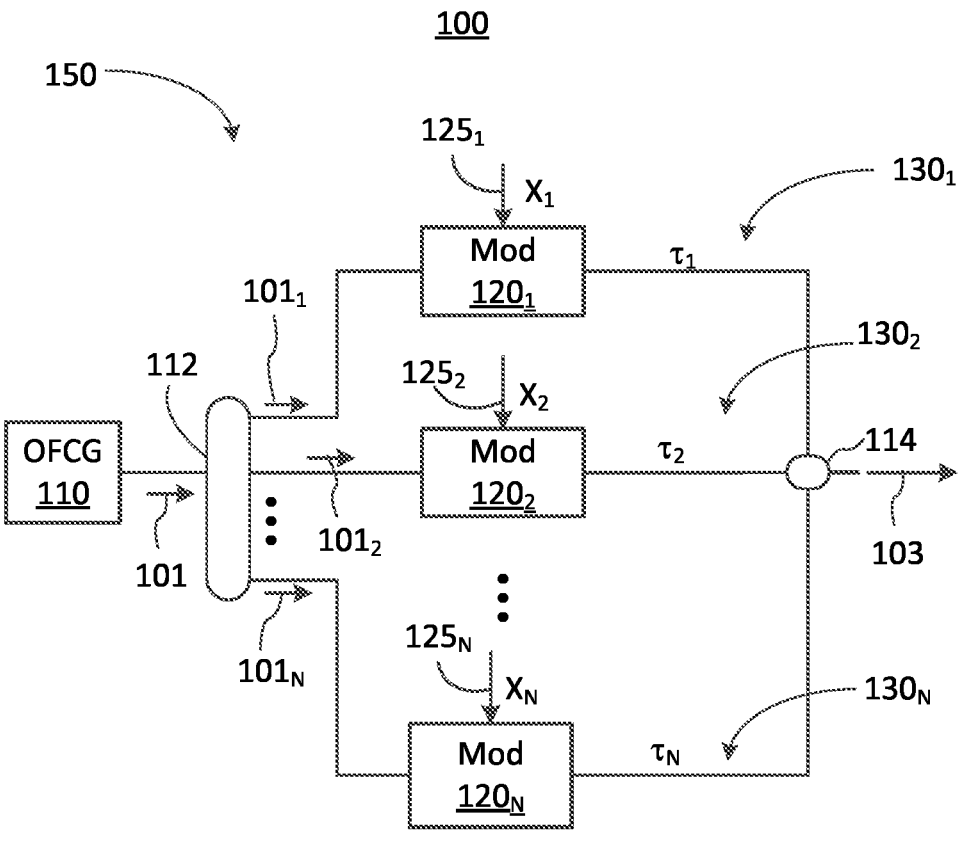
FIG. 1 is a schematic block diagram of a comb-based multi-channel optical transmitter.

FIG. 1 schematically illustrates an optical transmitter 100 according to an embodiment. The optical transmitter 100 is configured to transmit information by modulating a plurality of spectrally separate wavelengths, or frequency tones, with a plurality of modulating signals without demultiplexing the wavelengths to individual ones for modulation. The optical transmitter 100 includes a light source 110 and an electrical to optical converter (EOC) 150. The light source 110 is configured to generate light 101 having an optical frequency comb (OFC) spectrum 201 ("OFC 201") illustrated in FIG. 2. The light source 110 may be referred to as the OFC source 110. The OFC 201 comprises a plurality of separate optical frequency tones $201_1, \ldots, 201_N$ ("frequency tones $201_n$"), with corresponding optical frequencies $f_n$, and wavelengths $\lambda_n = c/f_n$, $n=1, \ldots, N$, c being the speed of light. In some implementations N may be equal or greater than 3, or equal or greater than 5, but may be generally in a range from 2 to 100 or greater. In operation, the separate optical frequency tones $201_n$ support corresponding wavelength channels over which the information may be transmitted by the optical transmitter 100. In an example embodiment, the OFC 201 includes at least three optical frequency tones $201_n$. In an example embodiment, at least three of the optical frequency tones $201_n$ are approximately equal in power; here, "approximately" means that the difference in power between the strongest and the weakest of the at least three optical frequency tones $201_n$ is less than 3 dB. In an example embodiment, the optical frequency tones $201_n$ are equidistant in frequency and have a same frequency spacing $\Delta f$ 210 (FIG. 2) across the OFC 201. By way of example, the frequency tone spacing $\Delta f$ 210 of the OFC source 110 may be typically from about 10 GHz to about 500 GHz.

The OFC source 110 may be any suitable optical comb source configured to generate a comb of mutually coherent, e.g. phase-locked, frequency tones $201_n$ in a target wavelength range, typically from about 1.3 micrometer (µm) to about 1.6 µm, e.g. in the O-band or C-band of telecommunication wavelengths. E.g., in some embodiments the OFC source 110 may be embodied as a mode-locked semiconductor laser, e.g. a quantum dash mode-locked laser diode (QD MLLD); in some embodiments, the OFC source 110 may be a Kerr nonlinearity comb, where a single continuous-wave (CW) laser is coupled into a microresonator to generate multiple frequency tones by Kerr nonlinearity; in some embodiments, the OFC source 110 may be an EO comb source, using electro-optical (EO) modulation of a CW laser using an RF frequency source. In some embodiments, the OFC source 110 may include a plurality of phase-locked single-frequency lasers configured to emit light at a corresponding one of the frequency tones $201_n$.

The EOC 150 includes a plurality of optical modulators $120_1, 120_2, \ldots, 120_N$ ("modulators $120_n$") connected in parallel to modulate different parts $101_1, 101_2, \ldots, 101_N$ of the OFC light 101 with corresponding modulating signals $125_1, 125_2, \ldots, 125_N$ ("modulating signals $125_n$"). The modulating signals $125_n$ may be synchronized to a same clock. In an example embodiment, each of the modulating signals $125_n$ is applied to each, or at least some, of the frequency tones $201_n$. The parts $101_n$ of the light are then combined by an optical combiner 114 to obtain output light 103 of the optical transmitter 100. To facilitate detecting individual streams of transmitted data by MIMO processing, the parts $101_n$ of the light 101 may be combined with different relative time delays $\tau_n$. By way of example, the optical modulators $120_n$ may be IQ modulators, so that each of the modulating signals $125_n$ may include a pair of corresponding in-phase (I) and quadrature (Q) modulating signals.

In the illustrated embodiment, the optical modulators $120_n$, $n=1, \ldots, N$, are connected in parallel between a 1×N optical splitter 112 and an N×1 optical combiner 114. The N optical paths $130_1, 130_2, \ldots, 130_N$ ("paths $130_n$") between (the input of) the optical splitter 112 and (the output of) the optical combiner 114 may have different optical lengths, and thus impose different time delays $\tau_1, \tau_2, \ldots, \tau_N$ ("$\tau_n$") upon the corresponding light parts $101_n$, as described below. The different optical paths $130_n$ may also be referred herein as the different branches $130_n$ of the EOC 150. In some typical implementations, the number N of the optical paths $130_n$ in the EOC 150 may be at least three, or at least five, with at least three, or at least five, respectively, different respective delays $\tau_n$.

In an example embodiment, the optical splitter 112 is a power splitter that does not discriminate, or only weakly discriminates, between different ones of the frequency tones $201_n$, so that each of the light parts $101_n$ of the light 101 includes the plurality of N separate optical frequency tones $201_n$, $n=1, \ldots, N$. Accordingly, each of the optical modulators $120_n$ modulates the entire set of the N separate optical frequency tones $201_n$ with a corresponding one of the modulation signals $125_n$, denoted "$X_n$". The optical combiner 114 may also be colorless, e.g. a power combiner that does not discriminate, or at most weakly discriminates, between different ones of the frequency tones $201_n$. Hence, each of the separate frequency tones $201_n$ in the output light 103 may be modulated with all N of the modulation signals $125_n$.

In some embodiments, the optical splitter 112 may have some wavelength selectivity, e.g. may be a coarse wavelength demultiplexer that does not discriminate, or at most weakly discriminates, between adjacent ones of the frequency tones $201_n$, so that each of the light parts $101_n$ of the light 101 includes at least two of the N separate optical frequency tones $201_n$, $n=1, \ldots, N$, and each of the frequency tones $201_n$ in the output light 103 is modulated with at least two of the modulation signals $125_n$.

Some aspects of the signal transmission and detection according to the method of the present disclosure are illustrated below using mathematical symbols and notations. It will be appreciated however that the mathematical description given below is symbolic and approximate in nature, and aspects of the actual operation of corresponding devices may deviate in details from the mathematical expressions given below.

Modulation of the output light 103 may be represented as a linear combination of modulating signals 125$_n$, accounting for the differences in frequency of the optical frequency tones 201$_n$ and the corresponding relative time delays $\tau_n$ in the EOC branches 130$_1$ to 130$_N$. Using matrix notation, the operation of the EOC 150 may be symbolically described by the following matrix equation (1):

$$\vec{Y} = \hat{M} \cdot \vec{X} \tag{1}$$

Here, $\vec{Y} = [Y_1, Y_2, \ldots, Y_N]^T$ is an N-element vector whose n-th element $Y_n$ represents an aggregated modulation signal of the n-th frequency tone 201$_n$ at the output of the EOC 150, $\vec{X} = [X_1, X_2, \ldots, X_N]^T$ is an N-element vector of the modulation signals $X_n$ 125$_n$, and $\hat{M}$ is a characterization matrix (CM) of the EOC 150 of size N×N. The superscript "T" in the vector expression "$[\ldots]^T$" denotes the transpose operation. Elements $M_{nm}$ of the characterization matrix $\hat{M}$ depend on the relative time delays $\tau_n$ in the EOC branches 130$_n$ and the frequency spacing(s) between the frequency tones 201$_n$, n=1, ..., N. In an example embodiment wherein the separate optical frequency tones 201$_1$, ..., 201$_N$ are approximately equally spaced with a same frequency spacing $\Delta f$ 210, elements $M_{nm}$ of the CM may be approximately described by equations (6) and (7) below.

The EOC 150 may be configured so that the characterization matrix M is inversible, i.e. has a non-zero determinant. The modulation signals $X_n$ 125$_n$ may then be retrieved from the output light 103 based on an inverse of the characterization matrix M:

$$\vec{X} = \hat{M}^{-1} \cdot \vec{Y} \tag{2}$$

where $\hat{M}^{-1}$ is the inverse of the characterization matrix $\hat{M}$, termed the inverse CM ("ICM"). Once the elements of the ICM are approximately determined, the modulation signals 125$_n$ $X_n(t)$ may be either individually recovered from the output light 103 based on the modulation signals in each of the frequency tones, or pre-configured at the optical transmitter so that each of the frequency tones 201$_n$ of the output light 103 is modulated with a corresponding target modulation signal. Elements of the ICM $\hat{M}^{-1}$ can be estimated by suitably characterizing the EOC 150 at a transmitter calibration stage, and/or using MIMO equalization processing at an optical receiver, e.g. as described below with reference to FIGS. 4 and 7.

To facilitate MIMO processing described by equation (2), the CM should be well conditioned for the inverse operation, preferably be close to unitary; to this end, the EOC 150 may be configured such that parts of the frequency tones 201$_n$ that pass through different ones of the optical modulators 120$_n$ are recombined with different (modulus $2\pi$) phases in the output light 103. This may be achieved by suitably selecting the delays $\tau_n$ of the EOC branches 130$_n$. In an example embodiment, the delays $\tau_n$ may be such that their remainders of a division by the OFC beat period $T_{OFC}=1/\Delta f$ may be approximately evenly spread in the [0, $T_{OFC}$) range, i.e. form an arithmetic sequence 0, 1/N, 2/N, ..., (N−1)/N when normalized to Torc. In an example implementation with N≥3, two of the delays $\tau_n$ modulo Torc differ by about or more than two thirds of the $T_{OFC}$, e.g. by at least 0.6 $T_{OFC}$.

In example implementations, the N branches 130$_n$ of the EOC 150 are configured to have the corresponding delays $\tau_n$ approximately given by equation (3):

$$\tau_n \bmod T_{OFC} = \frac{(n-1)}{N} \cdot \frac{1}{\Delta f}, \tag{3}$$

where n=1, 2 ..., N, and the expression "$\tau_n$ mod $T_{OFC}$" denotes the modulo operation, i.e. the remainder of the division of $\tau_n$ by $T_{OFC}$. In implementations, the delays $\tau_n$ may somewhat, e.g. within +\−20% of $(N\Delta f)^{-1}$, deviate from the values given in the RHS of equation (3), e.g. due to manufacturing tolerances. Equation (3) assumes, for clarity and by way of example, that the optical paths 130$_n$ in FIG. 1 are disposed in an increasing order of the delays $\tau_n$ modulo $T_{OFC}$; this is however not a requirement, and in other implementations the paths 130$_n$ may be disposed in a different order; e.g., adjacently located optical paths 130$_n$ may have delays $\tau_n$ (modulo $T_{OFC}$) associated therewith that are not consecutive in an ordered sequence of the delays $\tau_n$ modulo $T_{OFC}$, e.g. as given by the RHS of equation (3).

When the delays $\tau_n$ approximately satisfy equation (3), e.g. within the tolerance specified above, the CM of the EOC 150 is well-conditioned for the inversion, and the modulating signals 125$_n$ "$X_n$" applied to each of optical modulators 120$_n$ may be de-multiplexed from the aggregate modulation signals $Y_n$ of the frequency tones 201$_n$ at the output of the EOC 150.

Figure 3:
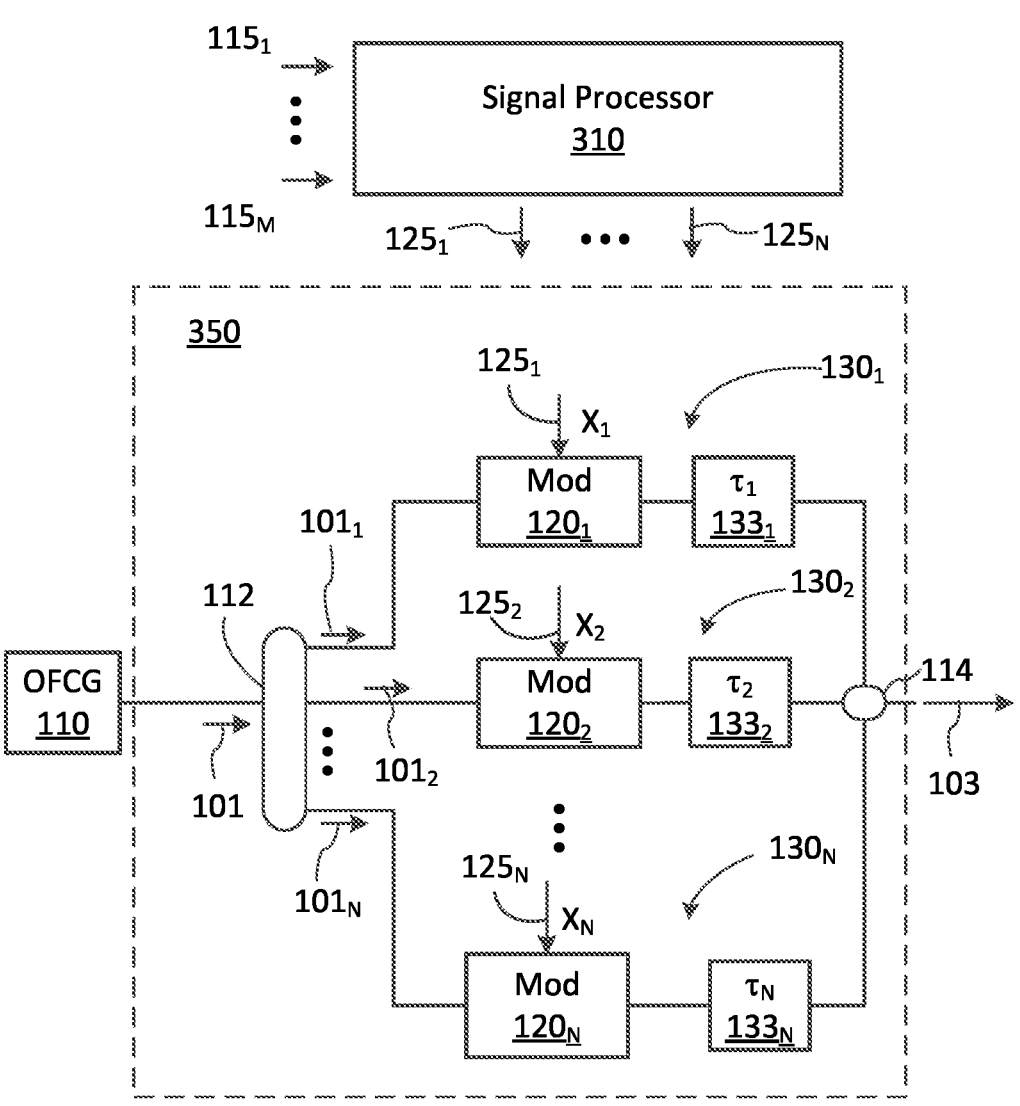
FIG. 3 is a schematic diagram illustrating an embodiment of the optical transmitter of FIG. 1 including a plurality of optical delay lines.

Referring to FIG. 3, there is schematically illustrated an optical transmitter 300 that includes an EOC 350 and a signal processor 310. The EOC 350 is an example implementation of the EOC 150 with optical delay lines 133$_n$ in the EOC branches 130$_n$. The optical delay lines 133$_n$ are configured such that the corresponding branches 130$_n$ provide the target delays $\tau_n$, e.g., approximately as described by the equation (3). In some implementations, the optical delay lines 133$_n$ may be tunable. In some implementations, the optical delay lines 133$_n$ may be disposed upstream from the corresponding optical modulators 120$_n$. The signal processor 310 is configured to process a plurality of input data streams, or data signals, 115$_1$, ..., 115$_M$, M≥2, and to convert them into the plurality of modulating signals 125$_1$, ..., 125$_N$, which are then applied to the corresponding optical modulators 120$_n$ as described above with reference to FIG. 1. The input data streams, or signals, 115$_1$, ..., 115$_M$ may be referred to herein as the data signal 115$_n$, or generally as the data signals 115.

MIMO Post-Processing

In a first example implementation, the optical transmitter 100 or 300 may be configured for point-to-point communications, where all of the data signals 115 are to be demultiplexed at a receiver site. In this example, M=N, and the signal processor 310 of the optical transmitter 300 may be configured to perform one-to-one mapping of the data signals 115$_n$ to the modulating signals 125$_n$ of the optical modulators 120$_n$. That is, each of the modulating signals 125$_n$ represents a corresponding one of the data signals 115$_n$. In implementations where the optical modulators 120$_n$ are IQ modulators, the mapping may include forming in-phase (I) and quadrature (Q) modulating signals from each of the input data signals 115$_n$, e.g. as known in the art. In this example, the modulation of each of the frequency tones 201$_n$ in the output light 103 carries the plurality of the data signals $115_n$. The modulating signals $125_n$ are superimposed in the output light 103 in a manner that allows for them, and thus the data signals $115_n$, to be commonly recovered at the optical receiver site by MIMO equalization.

Figure 4:
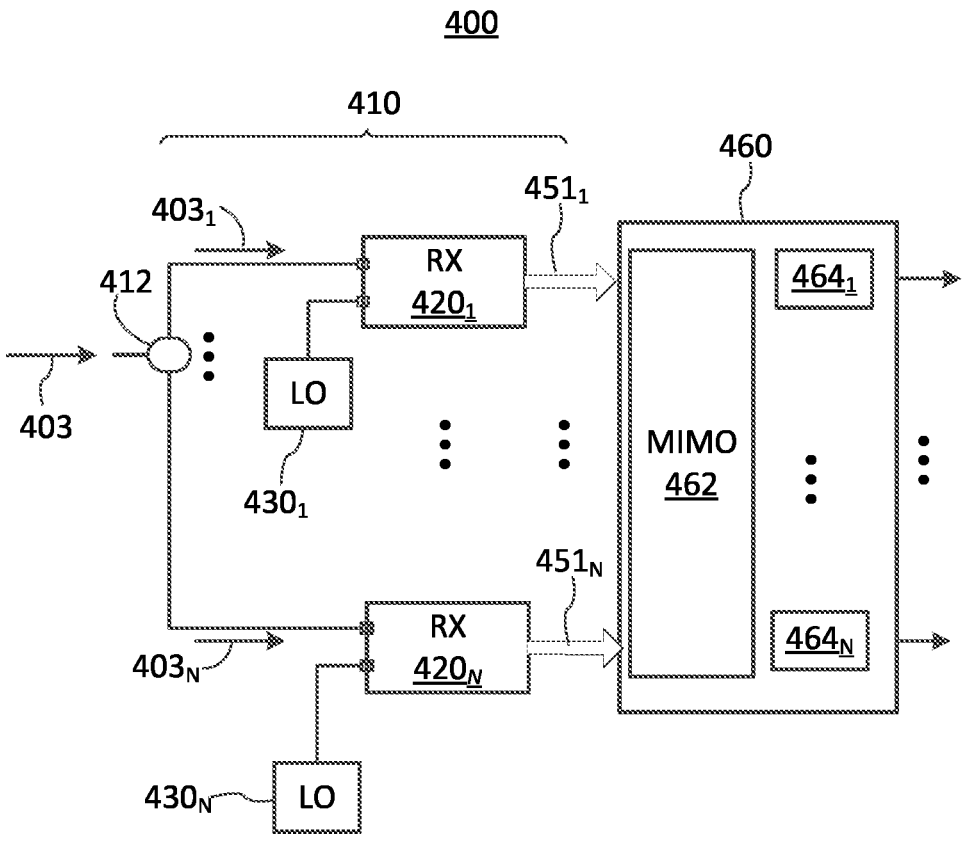
FIG. 4 is a schematic diagram illustrating an optical receiver with MIMO-based channel demultiplexing for use with some embodiments of the optical transmitter of FIG. 1 or FIG. 3.

FIG. 4 schematically illustrates an optical receiver 400 that may be used for point-to-point communication with embodiments of the optical transmitter 100 or 300. The optical receiver 400 is configured for processing optical signals generated by the optical transmitter 100 or 300 of the first example embodiment, typically but not exclusively after propagation over a fiber-optic link. The optical receiver 400 may also be used for calibrating implementations of the optical transmitter 100 or 300 that include MIMO pre-processing, as described below with reference to FIG. 5. The optical receiver 400 includes a multi-channel optical front end (OFE) 410 operatively followed by an electrical signal processor 460, e.g. a DSP. In the illustrated example, the OFE 410 includes N coherent optical-to-electrical converters (OECs) $420_n$, n=1, . . . , N, and a 1-to-N optical splitter 412 configured to split a received optical signal 403 ("received light 403"), or a polarization component thereof, between the N OECs $420_n$. The received optical signal 403 is the output light 103 of the optical transmitter 100 or 300 of the first embodiment, which may be somewhat distorted by the propagation over an optical link.

The OFE 410 is configured so that each of the OECs $420_n$ detects the modulation of a corresponding one of the frequency tones $201_n$ in the received light 403 in a wavelength-selective manner. In an example embodiment, the OECs $420_n$, being coupled to corresponding LO sources $430_n$, operate in a wavelength-selective manner, and the optical splitter 412 may be approximately colorless, i.e. configured to split the received light 403 without substantially discriminating between the frequency tones $201_n$. In other embodiments, the optical splitter 412 may be a wavelength demultiplexer, e.g. configured to selectively direct the frequency tones $201_n$ of the received light 403 to corresponding ones of the OECs $420_n$; in such embodiments, the OECs $420_n$ may be relatively insensitive to the received wavelength, e.g. may be non-coherent OECs configured for direct detection.

In the example illustrated in FIG. 4, each of the OECs $420_n$ is a coherent OEC configured to detect a modulation signal $451_n$ of one of the frequency tones $201_n$, e.g. by mixing a part of the received light 403 with light from a local oscillator (LO) $430_n$ that is tuned to a corresponding one of the frequency tones $201_n$, and to convert the mixed light to electrical signals. The detected modulation signals $451_n$, n=1, . . . , N, are digitized and provided to the DSP 460. The DSP 460 includes a MIMO equalizer 462, configured to perform MIMO equalization processing on the modulation signals $451_n$ detected for the corresponding frequency tones $201_n$, and to recover the modulating signals $125_n$ applied by the optical modulators $120_n$ at the transmitter.

By way of example, the OECs $420_n$ may be configured to down-convert the received optical signal into a pair of in-phase (I) and quadrature (Q) electrical signals, as known in the art. E.g., each of the OECs $420_n$ may include, e.g., a 90° optical hybrid followed by two balanced photodetector (PD) circuits connected to provide the I and Q electrical PD signals, denoted below as $S_{In}$ and $S_{Qn}$. The DSP 460 may be configured to process the digitized I and Q signals from each of the OECs $420_n$, e.g. in a manner that corresponds to combining them into a complex-valued IQ signal $$Y_n^r = (S_{In} + iS_{Qn}),$$

with $$Y_n^r$$

representing a received copy of the modulation signal $Y_n$ of the n-th frequency tone $201_n$. The MIMO equalizer 462 is configured to perform N×N MIMO equalization on the received signals $$\vec{Y}^r = [Y_1^r, Y_2^r, \ldots, Y_N^r]$$

to recover the modulating signals $X_n$ applied by the modulators $120_n$ in different branches of the EOC 150 or 350 of the optical transmitter 100 or 300. This is equivalent to finding an estimate of the inverse characterization matrix $\hat{M}^{-1}$ of the EOC 150 or 350, e.g. in accordance with equation 2. The MIMO equalizer 462 may use various techniques or algorithms of adaptive N×N MIMO equalization that are known in the art, including but not limited to zero-forcing, least mean square (LMS), or recursive least square (RLS), adaptive algorithms, training-added or decision-directed algorithms, successive interference cancellation algorithms, etc.

MIMO Pre-Processing

Figure 5:
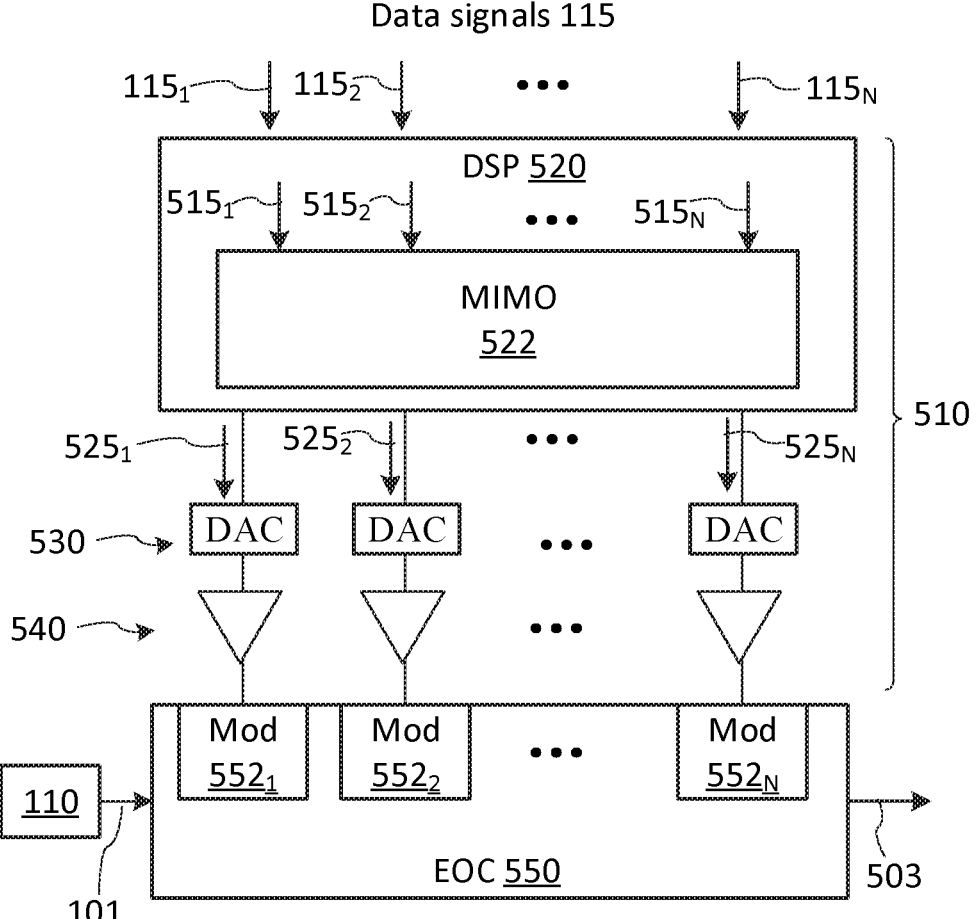
FIG. 5 is a schematic diagram illustrating a comb-based optical transmitter with colorless wavelength-division multiplexing using MIMO pre-processing.

FIG. 5 schematically illustrates an example optical transmitter 500 according to an aspect the present disclosure. The optical transmitter 500 is an embodiment of the optical transmitter 100 or 300 that employs MIMO pre-processing to generate WDM optical signals using light from an OFC source, e.g. 110, without requiring wavelength-selective multiplexers or de-multiplexers. Advantageously, different wavelength channels of output light 503 of the optical transmitter 500 may be independent of each other and may be routed to different destinations in an optical network. The optical transmitter 500 includes an electrical signal processing circuit 510 and an EOC 550. The EOC 550 is an embodiment of the EOC 150 or the EOC 350, and includes a plurality of optical modulators $552_n$ embodying the optical modulators $120_n$. The EOC 550 is configured to split OFC light 101 into N≥2 parts, typically but not necessarily three or more, each of the parts comprising the same N separate frequency tones $201_n$, modulate the parts with corresponding modulating signals $525_n$, and combine the modulated parts with corresponding delays $\tau_n$, as described above. Resulting modulation of the output light 503 of the transmitter 500 may be approximately described by the characterization matrix $\hat{M}$ of the EOC 550, e.g. as per equation (1).

The signal processing circuit 510 includes a DSP 520 configured to include a MIMO (pre) processor 522. The signal processing circuit 510 may further include digital to analog converters (DAC) 530 and modulator drivers 540, typically broad-band linear amplifiers. The MIMO processor 522 is configured to convert a plurality of target modulation signals $515_n$ for the corresponding frequency tones $201_n$, n=1, . . . , N, into the modulating signals $525_n$, the modulating signals $525_n$ being applied to the corresponding modulators $552_n$ to modulate the respective parts of the light 101 therewith. In operation, the DSP 520 may receive input streams of data $115_n$ to be transmitted to different destinations. The DSP 520 may be configured to generate the target modulation signals 515 from corresponding ones of the input data signals 115$_n$; corresponding DSP circuits or modules may be a part of the MIMO processor 522 in some embodiments. The DACs 530 and the modulator drivers 540 are configured to adapt each of the modulating signals 525$_n$ to a form suitable for driving a corresponding one of the optical modulators 552$_n$ of the EOC 550.

In an example implementation, the optical modulators 552$_n$ of the EOC 550 are IQ optical modulators configured to modulate the light with an in-phase (I) modulation signal and a quadrature (Q) modulation signal added with a 90° phase shift, as known in the art. The target modulation signals 515$_n$ and the modulating signals 525$n$ may be represented in such implementations by complex-valued signals $Z_n = (I_{Zn} + iQ_{Zn})$ and $T_n = (I_{Tn} + iQ_{Tn})$, respectively.

The operation of the MIMO processor 522 may be described by the following equation (4):

$$\vec{T} = \hat{M}^{-1} \cdot \vec{Z} \tag{4}$$

Where the matrix $\hat{M}^{-1}$ is the inverse of the characterization matrix $\hat{M}$ of the EOC 550, $\vec{Z}$ is a vector of length N whose elements $Z_n$, n=1, . . . , N, represent the target modulation signals 515$_n$ of corresponding frequency tones 201$_n$ of the output light 503, and $\vec{T}$ is a vector of length N whose n-th element $T_n$, n=1, . . . , N, represents the modulating signal 525$_n$ applied to a corresponding one of the optical modulators 552$_n$ of the EOC 550. The modulation $Y_n$ of the n-th frequency tone in the output light 503 of the transmitter 500 may then be described by the following matrix equation (5):

$$\vec{Y} = \hat{M} \cdot \vec{T} = \hat{M} \cdot \hat{M}^{-1} \cdot \vec{Z} = \vec{Z} \tag{5}$$

where $\vec{Y} = [Y_1, Y_2, \ldots, Y_N]^T$. Thus, each of the frequency tones 201$_n$ ("wavelength channels") in the output light 503 of the transmitter 500 carries only, or at least predominantly, a corresponding one of the target modulation signals 515$_n$ $Z_n$, n=1, . . . , N. That is, despite each of the optical modulators 552$_n$ modulating all of the frequency tones 201$_n$, the target modulation signals 515$_m$, $Z_m$, m=1, . . . , N, are mixed in each of the modulating signals 525$_n$, $T_n$, of the modulators 552$_n$ in such a way, e.g. with such relative phase-shifts, that all but a corresponding one of the target modulation signals 515$_n$ $Z_n$ approximately cancel each other in each of the frequency tones 201$_n$ of the output light 503. Advantageously, the modulated frequency tones 201$_n$ ("wavelength channels") of the output light 503 can then be individually routed to different destinations, as there is no need for their co-processing with other channels at a receiver site to recover any of the input data streams 115$_n$.

Figure 2:
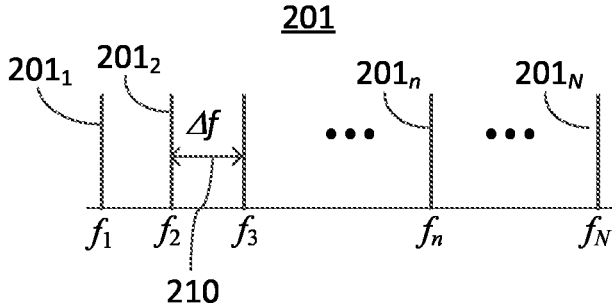
FIG. 2 is a schematic diagram schematically illustrating an optical frequency comb generated by a light source of the optical transmitter of FIG. 1 according to an embodiment.

The MIMO processor 522 may require information about the inverse matrix $\hat{M}^{-1}$ or the characterization matrix $\hat{M}$ of the EOC 550 to perform the MIMO operation described by equation (4). In an example embodiment, an element $M_{mn}$ in an m-th column and n-th row of the characterization matrix $\hat{M}$ of the EOC 550 may be approximately described by the following equation (6)

$$M_{nm} = A_n \varphi_{mn} R_m(f), \tag{6}$$

where the index m=1, . . . , N denotes optical paths of the EOC 550 (130$_1$, . . . , 130$_N$ in FIG. 1) and the index n=1, . . . , N denotes the frequency tones 201$_n$ (FIG. 2). $A_n$ is the amplitude coefficient of each of the frequency tones 201$_n$ and is approximately 1 when the OFC tones are approximately equal in power. $R_m(f)$ is the frequency response of the m-th optical path, which is frequency dependent mainly due to the optical modulator. The $R_m(f)$ may also account for optical power imbalances in different branches of the EOC 550. The "phase factor" $\varphi_{mn}$ in the RHS of equation (6) may be approximately expressed as $$\varphi_{mn} = \exp(-j2\pi\tau_m f_0) \exp(-j2\pi\tau_m \Delta f(n-1)) \tag{7}$$

The expression in the RHS of equation (7) may be understood by noting that a time delay t shifts an optical phase of a frequency tone f by $2\pi f \tau$, according to the time shifting property of Fourier transform.

In some embodiments, the CM of the EOC 550, i.e. the $\hat{M}$, can be determined by measuring the delays $\tau_n$, or differences therebetween, and the frequency response functions $R_n(f)$ in each of the modulator branches, e.g. using optical circuit measurement and calibration techniques known in the art. E.g., the frequency response of each of the optical modulators 552$_n$ may be individually characterized, one by one, by measuring the modulation signal in the output light 503 with a same reference receiver, in response to a same frequency-swept modulating signal (or a same wideband signal that covers the modulation bandwidth) being applied to different ones of the modulators 552$_n$.

In some embodiments, the optical transmitter 500 may be calibrated as a "black box", i.e. without performing individual measurements on different branches of the EOC 550, e.g. using a multi-channel coherent optical receiver tuned to the N frequency tones 201$_n$ ("wavelength channels"), such as e.g. the optical receiver 400 described above with reference to FIG. 4. The optical receiver used in the calibration may be typically co-located with the optical transmitter 500, or may be located at a different site. The calibration process may include i) applying N training modulating signals, which are known to the receiver, to the optical modulators 552$_n$ to modulate the output light 503, ii) receiving the output light 503 with the optical receiver, e.g. the optical receiver 400 of FIG. 4; performing the N×N MIMO equalization, e.g. as described above with reference to the MIMO equalizer 462, on signals detected for each of the frequency tones 201$_n$ by the optical front-end of the receiver, e.g. the OFE 401 of the receiver 400 of FIG. 4, to recover the known training signals. Internal settings of the N×N MIMO equalizer adapted to recover the transmitted training signals are then read to estimate matrix elements of the inverse characterization matrix $\hat{M}^{-1}$ of the EOC 550. The estimated matrix elements are then passed to the DSP 520 to configure the MIMO processor 522. The N×N MIMO equalization processing at the receiver may use known adaptive algorithms, such as but not limited to the zero forcing algorithm, least mean square algorithm, recursive least square algorithm, to obtain the MIMO filter coefficients based on the known training patterns used at the transmitter as the modulating signals 525$_n$.

Figure 6:
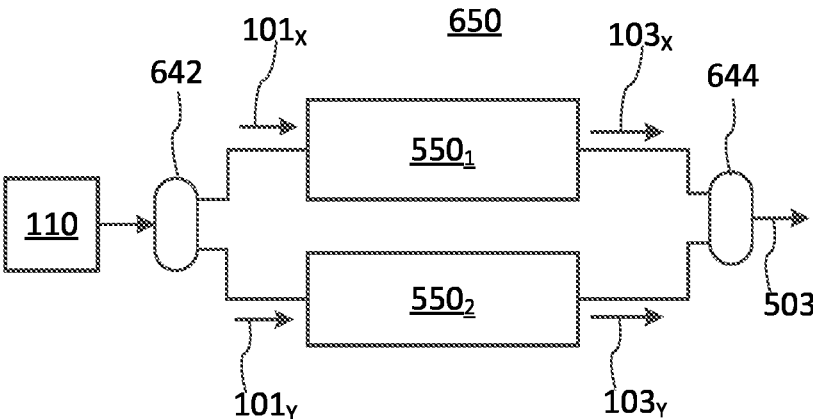
FIG. 6 is a schematic diagram of a dual-polarization multi-channel electrical-to-optical converter.

Referring to FIG. 6, any of the example optical transmitters 100, 300, 500 described above may be implemented as a dual-polarization (DP) optical transmitter. E.g., the optical transmitter 500 may include two instances of EOC 550, indicated in FIG. 6 as EOC 550$_1$ and EOC 550$_2$, to modulate corresponding orthogonal polarizations of light from the OFC source 110. The EOC $550_1$ and the EOC $550_2$ may be substantially identically configured. FIG. 6 illustrates an example arrangement, referred to herein as the DP EOC 650, wherein light from the OFC source 110 is split by a polarization splitter 642 into orthogonally-polarized light beams, $101_X$ and $101_Y$, typically of approximately same optical power. The light beams $101_X$ and $101_Y$ are then modulated by respective ones of the EOC $550_1$ and EOC $550_2$ to form modulated beams $103_X$ and $103_Y$, which are combined by a polarization combiner 644 to obtain the output light 503 of the optical transmitter. In such embodiments, the DSP 520 may include two instances of the N×N MIMO processor 522, which may operate independently to generate, from two different sets of N target modulation signals $515_n$, two sets of N modulating signals $525_n$. One of the two sets of N modulating signals $525_n$ is then applied to the optical modulators of the EOCs $550_1$, with the other of the two sets of N modulating signals $525_n$ being applied to the optical modulators of the EOC $550_2$. The MIMO processors 522 may be calibrated as described above independently for each polarization.

The DP EOC 650 may also be used in optical transmitters configured for communication links with the de-multiplexing MIMO equalization at the receiver end, as described above with reference to FIG. 4. In such configurations, the OECs $420_n$ of the optical receiver 400 may each be, e.g., a DP IQ OEC configured to mix orthogonal polarizations of the LO frequency tones with corresponding polarizations of the received light signal $403_n$. E.g., each of the OEC $420_n$ may include a DP 90° optical hybrid connected at its outputs to a balanced photodetector (PD) circuit to provide the I and Q electrical PD signals in each of the two polarization paths. The 4N electrical PD signals may then be digitized and processed by a suitably configured embodiment of the DSP 460, e.g. to combine said PD signals into two parallel streams of N complex-valued signal samples, one N-(complex) valued stream for each polarization. These two parallel streams are then passed to the MIMO equalization processor 462, which may be adapted to perform 2N×2N MIMO equalization. I.e., in a DP receiver, the MIMO equalizer 462 of FIG. 4 may be twice the size, in terms of the number of inputs, the MIMO equalizer 462 that may be used in a single-polarization example. In a DP IQ receiver, the MIMO equalizer 462 may be a 2N×2N MIMO equalizer configured to operate on 2N (complex-valued) input signals, each of the 2N (complex-valued) signals representing an IQ modulation signal detected for one of the N wavelength channels (frequency tones) of the received light in one of the two orthogonal polarizations thereof. The 2N×2N embodiments of the MIMO equalizer 462 may be configured to use one of adaptive MIMO equalization algorithms known in the art to simultaneously i) determine the inverse of the characterization matrices of the EOC $550_1$ and EOC$550_2$, ii) to compensate for the transmitter-receiver channel response, and iii) to separate the polarization tributaries of the received polarization-multiplexed signal. Separating the polarization tributaries may include compensating for polarization dynamics during fiber transmission, such as e.g. polarization rotation and polarization mode dispersion in a fiber-optic link of the channel. In some implementations, the 2N×2N MIMO equalizer operating on complex-valued signals may be replaced with a 4N×4N MIMO equalizer configured to operate on real-valued inputs, e.g. to compensate for frequency-dependent responses in the I-signal and Q-signal channels of the transmitter.

Figure 7:
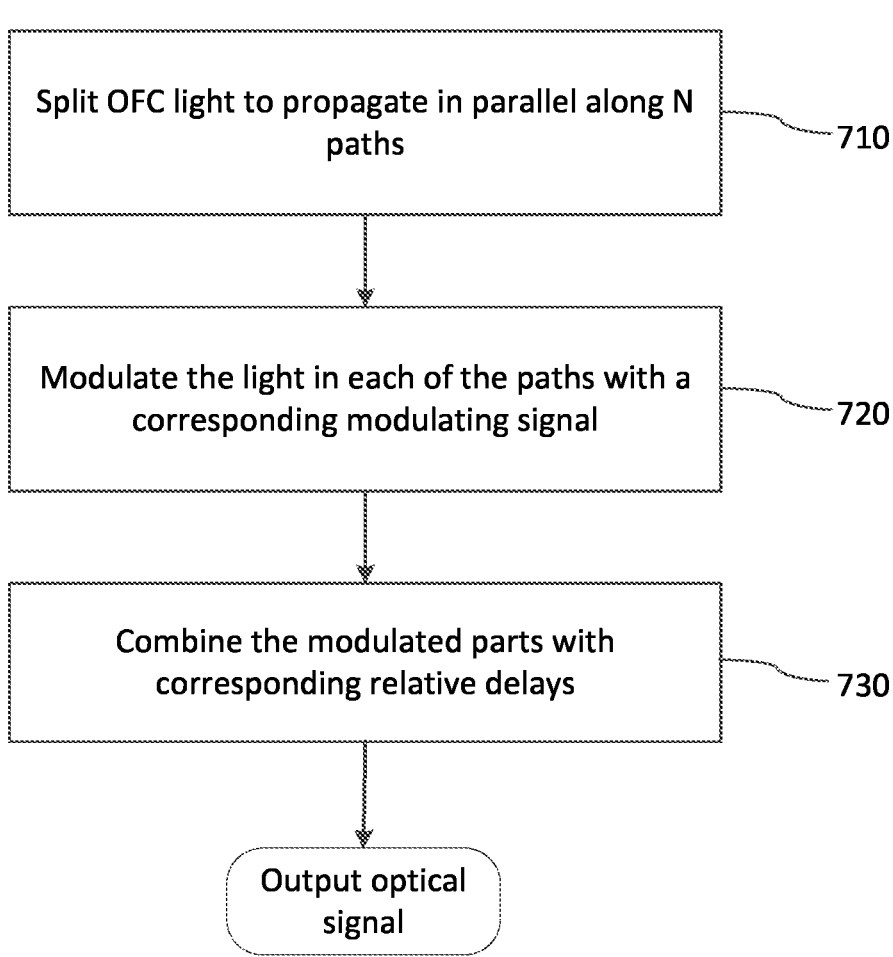
FIG. 7 is a flowchart of a method for transmitting a plurality of data signals over a plurality of corresponding wavelengths according to an embodiment.

FIG. 7 illustrates a method 700 that embodiments of the apparatus described above may implement. The method 700 includes: at (710), split light comprising a plurality of separate optical frequency tones, e.g. $201_n$, n=1, . . . , N, to propagate along N≥2 optical paths, e.g. $130_n$; at (720), modulating parts of the light propagating in each of the paths, e.g. $101_n$, with corresponding modulating signals, e.g. $125_n$ or $525_n$, each of the parts comprising the plurality of separate optical frequency tones, the paths imposing different delays $\tau_n$ upon the respective parts of the light; and at (730), combining the parts of the light with the different delays $\tau_n$ to obtain an output optical signal of the optical transmitter, e.g. the output light 103 or 503. In some implementations of the method, consecutive ones of the delays $\tau_n$ modulo Torc differ by a fraction of the beat period $T_{OFC}$ of the OFC light, the beat period being the inverse of a frequency spacing Δf of the optical tones (e.g. 210, FIG. 2), e.g. according to equation (3). The number of different paths may be 2 or greater. In some typical implementations, the number of paths is at least three; in such implementations, the delays $\tau_n$ include two delays that differ, modulo $T_{OFC}$, by about or more than two thirds of the Torc, e.g. by more than 0.6 $T_{OFC}$.

Figure 8:
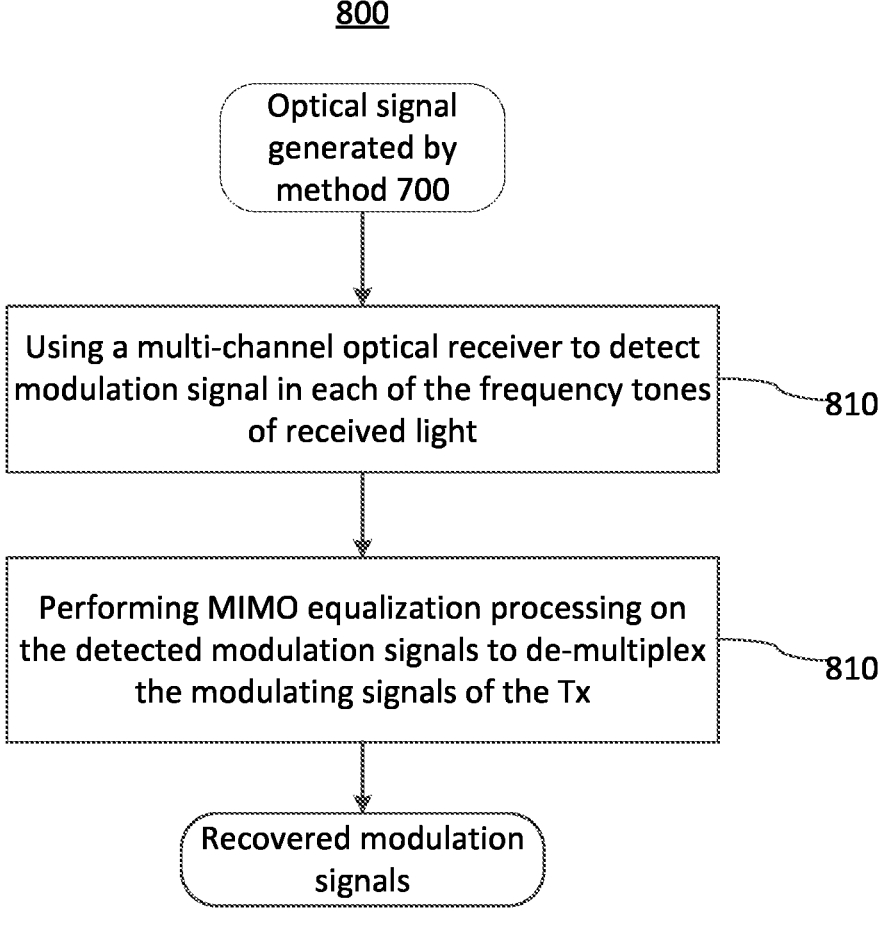
FIG. 8 is a flowchart of a method for an optical receiver to de-multiplex the plurality of data signals transmitted by the transmitter of FIG. 1 or FIG. 3 using MIMO processing.

FIG. 8 illustrates a method 800 that may be used in conjunction with the method 700. The method 800 includes: at (810), using a multi-channel optical receiver, e.g. 400, to detect modulation signal in each of the frequency tones, e.g. $201_n$, of light generated by the method 700; and at (820), performing MIMO equalization processing on the detected modulation signals to recover the modulating signals, e.g. $125_n$, used in step (720) of method 700 to modulate the different parts of the OFC light.

Figure 9:
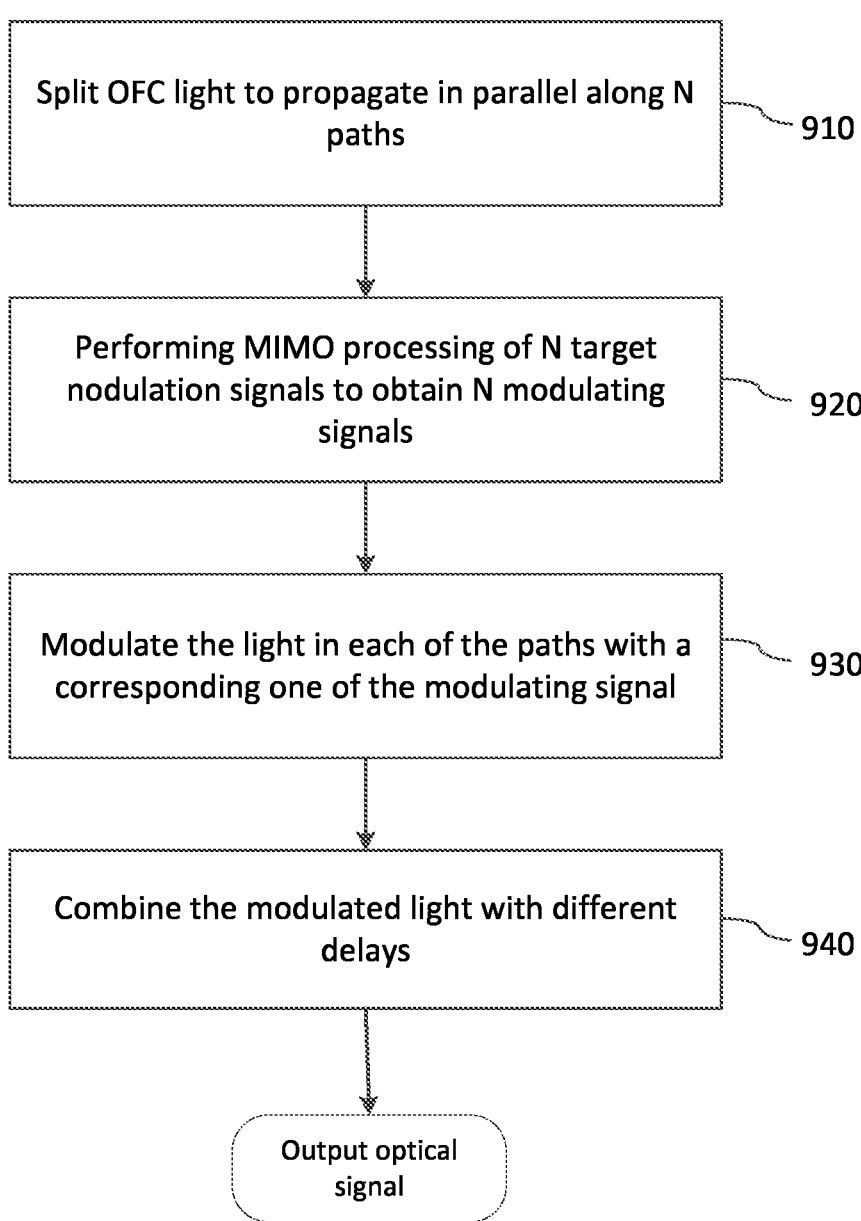
FIG. 9 is a flowchart of a method for colorless WDM at the optical transmitter of FIG. 1 or FIG. 3.

FIG. 9 illustrates a method 900 that may be implemented by an embodiment of the apparatus described above, e.g. with reference to FIGS. 1-7. The method 900 may start at (910) with splitting OFC light, e.g. 101, comprising a plurality of separate optical frequency tones, e.g. $201_n$, n=1, . . . , N, to propagate along N different paths. The number N of the different paths may be 2 or greater. In some typical implementations, the number of paths N is at least three; in such implementations, the delays $\tau_n$ include two delays that differ, modulo $T_{OFC}$, by at least 0.6 $T_{OFC}$.

At (920), the method 900 includes performing MIMO processing of N target modulation signals $Z_n$, e.g. $515_n$, to obtain N modulating signals $T_n$, e.g. $525_n$, n=1, . . . , N, e.g. as described above with reference to equation (4). At (930), the method 900 includes modulating parts of the OFC light propagating along the optical paths with respective ones of the modulating signals $T_n$, e.g. $525_n$, n=1, . . . , N, the parts of the OFC light in each of the paths comprising the N separate optical frequency tones, e.g. $201_n$.

At (940), the method 900 includes combining the modulated light from each of the paths with different delays $\tau_n$, n=1, . . . , N, to obtain an output optical signal of the optical transmitter, e.g. the output light 103 or 503. In some embodiments of the method 900, consecutive ones of the delays $\tau_n$ modulo Torc differ by approximately (1/N)th of a beat period Torc of the OFC. In some embodiments of the method 900, N is at least 3. In some embodiments of method 900, the MIMO processing at 920 is such that different ones of the optical frequency tones, e.g. $201_n$, in the output light are modulated with corresponding ones of the target modulation signals, e.g. $515_n$. In some embodiments of the method 900, the MIMO processing at step 920 generates each of the modulating signals $T_n$ by combining the target modulation signals $Z_m$, m=1, . . . , N, of the modulators, e.g. $552_n$, in such a way, e.g. with such relative phase-shifts, that all but a corresponding one of the target modulation signals $Z_n$ approximately cancel each other in each of the frequency tones $201_n$ of the output light, e.g. 503. Some embodiments of the method 900 includes calibrating the MIMO processing using a set of training modulating signals and a MIMO equalizer of a multi-channel optical receiver.

The examples of electrical to optical converters, optical transmitters, and optical receivers described above are not intended to be limiting, and many variations will become apparent to a skilled reader having the benefit of the present disclosure. For example, optical modulators in different EOC branches may differ from each other, and may use different, e.g. non-IQ, modulation formats. The term "OFC", as used in the present description, refers to a plurality of separate phase-locked optical frequency tones, and is not limited to a specific generation method. The optical frequency tones $201_n$ may be non-evenly spaced. The optical transmitters according to the present disclosure may be configured to operate in other wavelength ranges than described above. Suitable phase differences experiencing by different OFC frequency tones in the optical paths of the EOC may be induced by methods other than the different optical delay lines, e.g., using thermal phase shifters, or an LCoS-based (Liquid Crystal on Silicon) optical processor to selectively control the phases of the OFC frequency tones. The coherent receiver may use other structures than the one described above, such as, but not limited to, a 3×3 optical coupler followed by three single-ended photodetectors.

Furthermore, the technique described above can be extended to other multiplexing systems, such as for example a transmission system with space-division multiplexing (SDM) fiber. E.g., an SDM system with a mode number of m, the DP EOC 650 may be modified to include 2 m EOCs 550 to modulate m DP modes, with the combiner 644 being a polarization and spatial mode combiner. The receiver-side MIMO processor, e.g. 462, may be then configured to separate the signals transmitted over different frequency tones, the different polarization channels, and the different spatial modes.

One or more examples described above, e.g. in the summary section and with reference to any one or more of the FIGS. 1-9, provides an apparatus comprising an optical transmitter (e.g. 100, FIG. 1; 300, FIG. 3; 500, FIG. 5). The optical transmitter comprises an optical frequency comb (OFC) source (e.g. 110, FIGS. 1, 3, 5) to provide OFC light (e.g. 101, FIGS. 1, 3, 5) comprising a plurality, typically three or more, of separate optical frequency tones (e.g. $201_1$-$201_N$, FIG. 2). The optical transmitter further comprises an optical splitter (e.g. 112, FIGS. 1, 3) to split the OFC light to propagate along at least three different optical paths (e.g. $130_1$-$130_N$, FIGS. 1, 3), each of the paths comprising an optical modulator (e.g. one of $120_1$-$120_N$, FIGS. 1, 3; one of $552_1$-$552_N$, FIG. 5) to modulate received light (e.g. one of $101_1$-$101_N$, FIGS. 1, 3) with a respective modulating signal (e.g. one of $125_1$-$125_N$, FIGS. 1, 3; one of $525_1$-$525_N$, FIG. 5), each of the parts comprising the plurality of separate optical frequency tones. The optical transmitter further comprises an optical combiner (e.g. 114, FIGS. 1, 3) to combine light received from the at least three different paths to obtain an output optical signal (e.g. 103, FIGS. 1,3; 503, FIG. 5), of the optical transmitter. The at least three paths have different optical path lengths to impose different delays (e.g. $\tau_1$, ..., $\tau_N$, FIG. 1) to light propagating along different ones of the paths.

In some implementations, two of the delays modulo Torc may differ from each other by about or more than two thirds of a beat period $T_{OFC}$ of the OFC light, the beat period being the inverse of a frequency spacing $\Delta f$ of the optical frequency tones, $T_{OFC}=1/\Delta f$.

In any of the above implementations, the at least three different paths may comprise $N \geq 3$ paths to impose N of the delays such that every two consecutive ones of the delays modulo $T_{OFC}$ differ from each other by approximately $T_{OFC}/N$.

In any of the above implementations, the plurality of separate optical frequency tones comprises at least three different frequency tones of approximately equal power, e.g. within ±20% of an average per-tone power of the at least three different frequency tones.

In any of the above implementations, the optical transmitter may comprises a digital signal processor (DSP) (e.g. 520, FIG. 5) configured to perform multi-input multi-output (MIMO) processing (e.g. at 522, FIG. 5) on a plurality of target modulation signals (e.g. $515_n$, FIG. 5) to obtain the modulating signals (e.g. $525_n$, FIG. 5). In some of such implementations, the MIMO processing may be configured so that different ones of the optical frequency tones in the output optical signal (e.g. 503) are predominantly modulated by corresponding ones of the target modulation signals. In some of such implementations, the DSP (e.g. 520) is configured to perform the MIMO processing based on differences between the delays. In some implementations, the DSP (e.g. 520) may be configured to perform the MIMO processing (e.g. at 522, FIG. 5) based in part on frequency responses of the optical modulators (e.g. $552_n$, FIG. 5).

In some implementations, the apparatus may further comprise an optical receiver (e.g. 400, FIG. 4) for receiving the output optical signal of the optical transmitter (e.g. 100, FIG. 1; 300, FIG. 3), the optical receiver comprising a plurality of optical-to-electrical (OE) converters (e.g. $420_n$, FIG. 4) configured to detect modulation of corresponding ones of the optical frequency tones (e.g. $201_n$), and to output a plurality of detected modulation signals (e.g. $451_n$). In some implementations, the optical receive may comprise a digital signal processor (DSP) (e.g. 460) configured to perform multi-input multi-output (MIMO) processing (e.g. at 462, FIG. 4) on the plurality of detected modulation signals to separately estimate the modulating signals (e.g. $125_n$, FIGS. 1, 3).

In any of the above implementations, the optical modulators may comprise IQ modulators.

In any of the above implementations, the optical modulators may comprise dual-polarization modulators.

One or more examples described above, e.g. in the summary section and with reference to any one or more of the FIGS. 1-9, provides a method for optically transmitting a plurality of data signals, (e.g. $115_n$, FIGS. 1, 3, 5). The method comprises: splitting light (e.g. 101, FIGS. 1, 3, 5) comprising a comb (e.g. 201, FIG. 2) of separate optical frequency tones (e.g. $201_1$-$201_N$, FIG. 2), typically three or more, to propagate along at least three optical paths (e.g. $130_1$-$130_N$, FIGS. 1, 3); modulating parts (e.g. $101_n$, FIG. 1) of the light propagating along the at least three optical paths with respective modulating signals (e.g. $125_n$, FIGS. 1, 3; $525_n$, FIG. 5), each of the parts comprising the plurality of separate optical frequency tones; and combining the parts of the light to obtain an output optical signal such that every two of the parts are combined in the output optical signal with different delays.

In some implementations of the method, two of the different delays modulo $T_{OFC}$ may differ from each other by about or more than two third of a beat period $T_{OFC}$ of the comb, the beat period being the inverse of a frequency spacing $\Delta f$ of the optical frequency tones, $T_{OFC}=1/\Delta f$.

In any of the above implementations of the method, the at least three optical paths may comprise $N \geq 3$ paths, wherein every two consecutive ones of the different delays modulo $T_{OFC}$ may differ from each other by approximately $(T_{OFC}/N)$.

In any of the above implementations, the method may comprise performing MIMO processing of the data signals to obtain the plurality of modulating signals. In some implementations, the method may comprise performing the MIMO processing based at least in part on differences between the delays modulo $T_{OFC}$.

Any of the above implementations of the method may comprise configuring the MIMO processing such that different ones of the optical frequency tones in the output optical signal are modulated with corresponding ones of the data signals.

Any of the above implementations of the method may include calibrating the MIMO processing using a set of training modulating signals and a MIMO equalizer of a multi-channel optical receiver.

One or more examples described above, e.g. in the summary section and with reference to any one or more of the FIGS. 1-9, further provides a system comprising an optical transmitter (e.g. 100, FIG. 1; 300, FIG. 3; 500, FIG. 5) and an optical receiver (e.g. 400, FIG. 4). The optical transmitter comprises an OFC source (e.g. 110, FIGS. 1, 3, 5) to provide OFC light (e.g. 101, FIGS. 1, 3, 5) comprising a plurality of separate optical frequency tones (e.g. $201_n$, FIG. 2), a plurality of optical modulators (e.g. $120_1$-$120_N$, FIGS. 1, 3; $552_1$-$552_N$, FIG. 5) connected to modulate different parts (e.g. $101_1$-$101_N$, FIGS. 1, 3) of the OFC light with corresponding modulating signals (e.g. $125_1$-$125_N$, FIGS. 1, 3; $525_1$-$525_N$, FIG. 5), each of the parts comprising the plurality of separate optical frequency tones. The optical transmitter further comprises an optical combiner (e.g. 114, FIGS. 1,3) for combining the different parts of the OFC light to obtain an output optical signal (e.g. 103, FIGS. 1,3; 503, FIG. 5) of the optical transmitter. The optical receiver (e.g. 400, FIG. 4) comprises a plurality of OE converters (e.g. $420_n$, FIG. 4) configured to detect modulation of corresponding ones of the optical frequency tones (e.g. $201_n$), and to output a plurality of detected modulation signals (e.g. $451_1$-$451_N$). The optical receiver further comprises a digital signal processor (e.g. 460) configured to perform multi-input multi-output (MIMO) processing (e.g. at 462, FIG. 4) on the plurality of detected modulation signals to separately estimate the modulating signals (e.g. $125_n$, FIGS. 1, 3; $525_n$, FIG. 5).

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

I claim:

1. An apparatus comprising:
   an optical transmitter comprising:
      an optical frequency comb (OFC) source to provide OFC light comprising a plurality of separate optical frequency tones;
      an optical splitter to split the OFC light to propagate along at least three different paths, each of the paths comprising an optical modulator to modulate received light with a respective modulating signal, wherein the received light of each of the optical modulators comprises the plurality of separate optical frequency tones; and
      an optical combiner to combine light received from the at least three different paths to obtain an output optical signal of the optical transmitter,
      wherein the at least three paths have different optical path lengths to impose different delays to light propagating along different ones of the paths.

2. The apparatus of claim 1, wherein two of the delays modulo $T_{OFC}$ differ from each other by about or more than two thirds of a beat period $T_{OFC}$ of the OFC light, the beat period being the inverse of a frequency spacing $\Delta f$ of the optical frequency tones, $T_{OFC}=1/\Delta f$.

3. The apparatus of claim 1, wherein the at least three different paths comprise $N \geq 3$ paths to impose N of the delays such that every two consecutive ones of the delays modulo $T_{OFC}$ differ from each other by approximately $T_{OFC}/N$, $T_{OFC}/N$ being $T_{OFC}$ divided by N, $T_{OFC}$ being a beat period of the OFC light, the beat period being the inverse of a frequency spacing $\Delta f$ of the optical frequency tones, $T_{OFC}=1/\Delta f$.

4. The apparatus of claim 1 wherein the plurality of separate optical frequency tones comprises at least three different frequency tones of approximately equal power.

5. The apparatus of claim 1 wherein the optical transmitter comprises a digital signal processor (DSP) configured to perform multi-input multi-output (MIMO) processing on a plurality of target modulation signals to obtain the respective modulating signals.

6. The apparatus of claim 5 wherein the MIMO processing is configured so that different ones of the optical frequency tones in the output optical signal are modulated by respective ones of the target modulation signals.

7. The apparatus of claim 5 wherein the at least three different paths comprise N≥3 of the paths configured such that every two consecutive ones of the different delays modulo $T_{OFC}$ differ from each other by approximately $(T_{OFC}/N)$, the Torc being the inverse of a frequency spacing $\Delta f$ of the optical frequency tones.

8. The apparatus of claim 5, wherein the DSP is configured to perform the MIMO processing based in part on frequency responses of the optical modulators.

9. The apparatus of claim 1, further comprising an optical receiver for receiving the output optical signal of the optical transmitter, the optical receiver comprising a plurality of optical-to-electrical (OE) converters configured to detect modulation of corresponding ones of the optical frequency tones, and to output a plurality of detected modulation signals, wherein the optical receiver comprises a digital signal processor (DSP) configured to perform multi-input multi-output (MIMO) processing on the plurality of detected modulation signals to separately estimate the modulating signals.

10. The apparatus of claim 1, wherein at least some of the optical modulators comprise IQ modulators.

11. The apparatus of claim 1, wherein the optical modulators comprise dual-polarization modulators.

12. A method for optically transmitting a plurality of data signals, the method comprising:

splitting light comprising a comb of separate optical frequency tones to propagate along at least three optical paths, the at least three optical paths having different optical path lengths to impose different delays upon the light propagating along the different paths;

modulating parts of the light propagating along the at least three optical paths with respective modulating signals, each of the parts comprising the comb of separate optical frequency tones; and combining the at least three different parts of the light to obtain an output optical signal, wherein the different ones of the parts are combined in the output optical signal with the different delays.

13. The method of claim 12 wherein two of the different delays modulo $T_{OFC}$ differ from each other by about or more than two thirds of a beat period $T_{OFC}$ of the comb, the beat period being the inverse of a frequency spacing $\Delta f$ of the optical frequency tones, $T_{OFC}=1/\Delta f$.

14. The method of claim 12 wherein the at least three optical paths comprise N≥3 paths, and wherein every two consecutive ones of the different delays modulo Torc differ from each other by approximately $T_{OFC}/N$, $T_{OFC}/N$ being $T_{OFC}$ divided by N, $T_{OFC}$ being a beat period of the OFC light, the beat period $T_{OFC}$ being the inverse of a frequency spacing $\Delta f$ of the optical frequency tones.

15. The method of claim 14, comprising performing multi-input multi-output (MIMO) processing of the plurality of data signals to obtain the modulating signals.

16. The method of claim 15 comprising performing the MIMO processing based at least in part on differences between the delays modulo $T_{OFC}$.

17. The method of claim 16, comprising configuring the MIMO processing such that different ones of the optical frequency tones in the output optical signal are modulated with respective ones of the data signals.

18. The method of claim 15, including calibrating the MIMO processing using a set of training modulating signals and a MIMO equalizer of a multi-channel optical receiver.

19. A system comprising:

an optical transmitter comprising:

an optical frequency comb (OFC) source to provide OFC light comprising a plurality of separate optical frequency tones;

a plurality of optical modulators connected to modulate different parts of the OFC light with respective modulating signals, each of the parts comprising the plurality of separate optical frequency tones; and an optical combiner to combine the different parts of the OFC light with different respective delays to obtain an output optical signal; and an optical receiver comprising:

a plurality of optical-to-electrical (OE) converters to detect modulation of respective ones of the optical frequency tones in an optical signal received from the optical transmitter, and to output a plurality of detected modulation signals; and a digital signal processor configured to perform multi-input multi-output (MIMO) processing on the plurality of detected modulation signals to separately estimate the modulating signals of the optical transmitter.

20. The system of claim 19, wherein the plurality of optical modulators comprise N≥2 optical modulators to modulate N of the different parts of the OFC light, the N of the different parts of the OFC light being combined in the output optical signal with the respective delays, and wherein every two consecutive ones of the respective delays modulo $T_{OFC}$ differ from each other by approximately $(T_{OFC}/N)$, the Torc being the inverse of a frequency spacing $\Delta f$ of the optical frequency tones, $T_{OFC}=1/\Delta f$.

* * * * *